FIGURE 2

United States Patent [19]

Bierenbaum et al.

[11] 3,843,761

[45] Oct. 22, 1974

[54] PROCESS FOR PREPARING A THERMOPLASTIC MICROPOROUS FILM INVOLVING A COLD STRETCHING STEP AND MULTIPLE HOT STRETCHING STEPS

[75] Inventors: Harvey S. Bierenbaum, Berkeley Heights; Lawrence R. Daley, Dover; Daniel Zimmerman, East Brunswick; Ian L. Hay, Summit, all of N.J.

[73] Assignee: Celanese Corporation, New York, N.Y.

[22] Filed: May 30, 1973

[21] Appl. No.: 365,365

[52] U.S. Cl............. 264/210 R, 161/159, 161/402, 264/41, 264/235, 264/288, 264/DIG. 73
[51] Int. Cl.................... B29d 7/24, B29d 27/00
[58] Field of Search ...... 264/41, 288, DIG. 13, 235, 264/DIG. 73; 161/159, 402

[56] References Cited
UNITED STATES PATENTS

| | | | |
|---|---|---|---|
| 3,426,754 | 2/1969 | Bierenbaum et al. | 264/DIG. 13 |
| 3,549,743 | 12/1970 | Riordon | 264/290 R |
| 3,558,764 | 1/1971 | Isaacson et al. | 264/DIG. 13 |
| 3,666,517 | 5/1972 | Isaacson | 264/DIG. 13 |
| 3,679,538 | 7/1972 | Druin et al. | 264/DIG. 13 |
| 3,679,540 | 7/1972 | Zimmerman et al. | 161/402 X |
| 3,738,904 | 6/1973 | Ikeda et al. | 264/289 UX |
| 3,801,404 | 4/1974 | Druin et al. | 161/402 X |
| 3,801,692 | 4/1974 | Zimmerman | 264/288 X |

*Primary Examiner*—Philip E. Anderson
*Attorney, Agent, or Firm*—Thomas J. Morgan; Linn I. Grim; Marvin Bressler

[57] ABSTRACT

A process for the preparation of an open-celled microporous polymer film. The process includes the steps of cold stretching a non-porous, crystalline, elastic film significantly below the polymeric crystalline melting point of the polymer. The cold stretched film is then stretched, at a temperature slightly below the polymeric crystalline melting point of the film. The hot stretching procedure embodies a plurality of discrete sequential stretching operations.

13 Claims, 2 Drawing Figures

PROCESS FOR PREPARING A THERMOPLASTIC MICROPOROUS FILM INVOLVING A COLD STRETCHING STEP AND MULTIPLE HOT STRETCHING STEPS

BACKGROUND OF THE DISCLOSURE

1. Field of the Invention

The instant invention is directed to a process for the preparation of an open-celled microporous polymer film. More specifically, the instant invention is directed to a process for the preparation of an open-celled microporous film in which the micropores are formed by sequential stretching. Still more specifically, the instant invention is directed to a process for the preparation of an open-celled microporous polymer film in which microporous film is formed by a cold stretching step followed by a plurality of sequential hot stretching steps.

2. Background of the Prior Art

Recent developments in the field of microporous films have resulted in improved microporous film products and processes for forming these products. The most recent of these developments are exemplified by U.S. Pat. No. 3,679,538 and U.S. Pat. No. 3,679,540 both issued on July 25, 1972, copending U.S. Patent application Ser. No. 43,608, filed on June 4, 1970, copending U.S. Patent application Ser. No. 104,715, filed on Jan. 7, 1971 and both assigned to the assignee of the present application and copending U.S. Patent application Ser. No. 271,476, filed on July 13, 1972 and now U.S. Pat. No. 3,801,404. All of the above mentioned patents and patent applications have in common the disclosure of a process comprising the steps of cold stretching a non-porous, crystalline, elastic film, thereafter hot stretching the cold stretched film and finally heat setting the microporous film. All of these inventions represent improvements in the process for forming a microporous film and the film formed thereby. However, there are still certain disadvantages in the process presently employed for forming a microporous film in that there are certain properties of microporous films which need improvement for greater acceptance in the market place. Moreover, the prior art process includes steps which are subject to optimization and/or improvement.

Of all the properties that a microporous film possesses, one of the most important is gas flux. Gas flux of a microporous film is quantitatively defined as the volume of gas that flows through the pores of a fixed surface area of film in a fixed period of time. Although the microporous films of the prior art provide good permeability, the need for even further improvements in this property have been noted in many applications of microporous film.

It should be appreciated that maximizing gas flux is important in many applications where the film is used as means for separating gas-liquid systems. For example, when microporous films are employed in batteries which generate vapors the film must have maximized gas flux properties in order to vent the gases formed without permitting the loss of any liquid.

Another property which is of critical importance in microporous films is film stability. Film stability may be defined as the lack of change in film dimension and in flux resulting from exposure to high temperature. The importance of film stability is apparent. A film having good initial gas flux must maintain this flux over long periods of time in order to be effective in its applications. The need for good long term dimensional stability is also critcal. For instance, the use of a microporous film as a membrane requires that its dimension not change. If the film were to shrink as in the case of a film having poor dimensional stability, the barrier provided by the membrane would be broken and the system would fail. In the past this property, or more correctly, the lack of this property hindered the development of microporous films. Improvements have been made in film stability, as exemplified by the above-identified patents and patent applications, but still further improvement in this property is necessary in order to increase the utilization of microporous films, especially in high temperature applications.

Yet another property that has been improved in the prior art but still has been subject to certain criticisms by users of microporous films is opaqueness. Opaqueness is the technical term often applied to denote the whiteness of the microporous film. This property is esthetically important to users of the film who employ it in applications where it is visible to the user. Examples of such applications include sanitary napkins, diaper linings and the like.

SUMMARY OF THE INVENTION

The instant invention is directed to an improved process for the preparation of an open-celled microporous film. The process of the instant invention provides an improved microporous film having greater gas flux than the microporous films of the prior art made from the same precursor film. The film formed by the process of the instant invention also is distinguished from the films of the prior art in that it possesses greater stability against changes in gas flux when exposed to high temperature environments. FInally, the process of the instant invention is an improvement over the processes for producing microporous films in the prior art due to the improved opaqueness of the microporous film formed in this process.

In accordance with the instant invention a process is provided for the preparation of an open-celled microporous film. The process includes the step of cold stretching a non-porous, crystalline, elastic film at a temperature in the range of between about room temperature and about 20° below the polymeric crystalline melting point of the film. The cold stretched film is thereafter sequentially hot stretched in a plurality of discrete hot stretching increments at a temperature in the range of between about 20° C. below the polymeric crystalline melting point to a temperature 5° C. below the crystalline meltin point of the film.

BRIEF DESCRIPTION OF THE DRAWINGS

The instant invention may be better understood with reference to the accompanying drawings of which:

FIG. 1 is a schematic representation of a preferred embodiment of the instant invention.

DETAILED DESCRIPTION

The process of this invention teaches the preparation of microporous films which are formed from a starting elastic film of crystalline, film-forming polymers. These elastic films have an elastic recovery at 0 recovery time (hereinafter defined) when subjected to a standard strain(extension) of 50 percent at 25° C. and 65 percent relative humidity of at least about 40 percent, preferably at least about 50 percent and most preferably at least about 80 percent.

Elastic recovery as used herein is a measure of the ability of a structure or a shaped article, such as a film, to return to its original size after being stretched, and may be calculated as follows: percent elastic recovery equals length after stretching multiplied by 100 minus length before stretching multiplied by 100 divided by length before stretching.

Although a standard strain of 50 percent is used to identify the elastic properties of a starting film employed in the instant invention, such strain is merely exemplary. In general, such starting films will have elastic recoveries higher at strains less than 50 percent, and somewhat lower at strains substantially higher than 50 percent, as compared to their elastic recovery at a 50 percent strain.

The starting elastic films, employed in the instant invention, will also have a percent crystallinity of at least 20 percent, preferably at least 30 percent, and most preferably at least 50 percent, e.g., about 50 to 90 percent, or more Percent crystallinity is determined by the X-ray method described by R. G. Quynn et al. in the Journal of Applied Polymer Science, Vol. 2, No. 5, pp. 166–173 (1959). For a detailed discussion of crystallinity and its significance in polymers, see Polymers and Resins, Golding (D. Van Nostrand, 1959).

The starting elastic films utilized in the preparation of the microporous films of the present invention should be differentiated from films formed from classical elastomers such as natural and synthetic rubbers. With such classical elastomers the stress-strain behavior, and particularly the stress-temperature relationship, is governed by the entropy-mechanism of deformation (rubber elasticity). The positive temperature coefficient of the retractive force, i.e., decreasing stress with decreasing temperature and complete loss of elastic properties at the glass transition temperatures, are particularly consequences of entropy-elasticity. The elasticity of the starting elastic films utilized herein, on the other hand, is of a different nature. In quantitative thermodynamic experiments with these elastic starting films, increasing stress with decreasing temperature (negative temperature coefficient) may be interpreted to mean that the elasticity of these materials is not governed by entropy effects but rather are dependent upon an energy term. More significantly, the starting elastic films, employed in the instant invention, generally have been found to retain their stretch properties at temperature where normal entropy-elasticity could no longer be operative. Thus, the stretch mechanism of the starting elastic films of the instant invention is thought to be based on energy-elasticity relationships, and these elastic films may then be referred to as "non-classical elastomers."

As stated above, the starting elastic films employed in this invention are made from a polymer of a type capable of developing a significant degree of crystallinity, as contrasted with more conventional or "classical" elastic materials such as the natural and synthetic rubbers which are substantially amorphous in their unstretched or tensionless state.

A significant group of polymers, i.e., synthetic resinous materials, to which this invention may be applied are the olefinic polymers, e.g., polyethylene, polypropylene, poly-3-methyl butene-1, poly-4-methyl pentene-1, as well as copolymers of propylene, 3-methyl butene-1, 4-methyl pentene-1 or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene-1, or other relative long chain alkenes, as well as copolymers of 3-methyl pentene-1 and any of the same n-alkenes mentioned previously in connection with 3-methyl butene-1. These polymers in the former film should generally have a percent crystallinity of at least 20 percent, preferably at least 30 percent, and most preferably about 50 percent to 90 percent or higher.

For example, a film-forming homopolymer of polypropylene may be employed. When propylene homopolymers are contemplated, it is preferred to employ an isotactic polypropylene having a percent crystallinity as indicated above, a weight average molecular weight ranging from about 100,000 to 750,000, and preferably about 200,000 to 500,000 and a melt index (ASTM-1958D- 1238-57T, part 9, page 38) from about 0.1 to about 75, and preferably about 0.5 to 30, so as to give a final film product having the requisite physical properties.

The process of the instant invention is also particularly useful in the preparation of open-celled microporous films formed from homopolymers and copolymers of polyethylene and is in this respect generally superior to previous known microporous film processes.

While the present disclosure in examples are directed primarily to the aforementioned olefin polymers, the invention also contemplates the employment of high molecular weight acetal, e.g., oxymethylene polymers. While both acetal homopolymers and copolymers are contemplated, the preferred acetal polymer is a "random" oxymethylene copolymer, i.e., one which contains recurring oxymethylene, i.e., $-CH_2O-$ units interspersed with $-OR-$ groups in the main polymer chain, where R is a divalent radical containing at least two carbon atoms directly linked to each other and positioned in the chain between the two valences with any substituent on said R radical being inert, that is, substituents which do include interfering functional groups which induce undesirable reactions and wherein a major amount of the $-OR-$ units exist as single units attached to oxymethylene groups on each side. Examples of preferred polymers include copolymers of trioxane and cyclic ethers containing at least two adjacent carbon atoms such as the copolymers disclosed in U.S. Pat. No. 3,027,352. These polymers in film form may also have a crystallinity of at least 20 percent, preferably at least 30 percent, and most preferably at least 50 percent, e.g., 50 to 60 percent or higher. Further, these polymers have a melting point of at least 150° C. and a number average molecular weight of at least 10,000. For a more detailed discussion of acetal and oxymethylene polymers, see, Formaldehyde, Walker, pp. 175–191, (Reinhold, 1964).

Other relative crystalline polymers to which the invention may be applied are the polyalkylene sulfides such as polymethylene sulfide and polyethylene sulfide, the polyarylene oxides such as polyphenylene oxide, the polyamides such as polyhexamethylene adipamide (nylon 66) and polycaprolactam (nylon 6), and the polyesters such polyethylene terephthalate all of which are well known in the art and need not be described further.

The preferred method for forming the starting elastic films, employed in the instant invention, is the blown film extrusion method. In this method a hopper and an extruder are employed. The resin is introduced into the hopper of the extruder which contains a screw and a jacket fitted with heating elements. The resin is melted and transferred by the screw to the die. The melt is extruded through the die through a circular slot to form a tubular film having an initial diameter $D_1$. Air enters the system through an inlet into the interior of the tubular film and has the effect of blowing up the diameter of the tubular film to a diameter $D_2$. Means such as air rings may also be provided for directing the air about the exterior of the extruded tubular film to provide quick and effective cooling. Means such as a cooling mandrel may be used to cool the interior of the tubular film. After a short distance during which the film is allowed to completely cool and harden the film is collapsed and wound up on a take-up roll.

Using the blown film method, the drawdown ratio, or more simply, the draw ratio, which is defined as the ratio of the thickness of the extruded film, which is equivalent to the slot opening of the die, to the final thickness of the film of the blown film is preferably in the range of between about 20:1 to 200:1, with the slot opening being in the range of about 10 to 200 mils. The ratio of the blown film to the unblown film, or more simply the $D_2/D_1$ ratio, is in the range of between about 0.5:1 to 6.0:1 and more preferably 1.0:1 to about 2.5:1. The take-up speed, the rotational speed of the take-up roll, is preferably in the range of between about 10 and 1,000 ft/min. That is, the take-up roll is maintained at a rotational speed sufficient to wind 10 to 1,000 linear feet of film per minute. The melt temperature for blown film extrusion is preferably in the range of between about 10° C. above the melting point of the polymer to about 100° C. above the melting point of the polymer.

A second preferred method for forming the starting elastic film of the instant invention is the slit die extrusion method. In this method a film extruder equipped with a shallow channel metering screw and coat hanger die is employed. Again, the resin is introduced into the hopper of the extruder which contains a screw. The hopper is jacketed to heat the resin until the resin melts. The melt is transferred by the screw to the die from which it is extruded through a slot in the form of a film from which it is drawn by a take-up or casting roll. More than one take-up roll in various combinations or stages may be used. The die opening or slot width is preferably in the range of between about 10 to 200 mils.

The film is again extruded at a drawdown ratio of about 20:1 to 200:1. More preferably the drawdown ratio is in the range of between about 50:1 to about 150:1. The term "drawdown ratio" or, "draw ratio" when spoken of in relation to slit die extrusion denotes the ratio of the film wind-up or take-up speed to the speed of the film issuing from the extrusion die.

The melt temperature range employed in slit die film extrusion is the same as that employed in blown film extrusion.

In the preferred embodiment wherein the polymer employed is polypropylene, the melt temperature is in the range of between about 180° C. to 270° C. and more preferably 200° C. to 240° C. In another preferred embodiment wherein polyethylene is employed as the film the polyethylene melt temperature is in the range of between about 175° C. to 225° C. In the still further preferred embodiment wherein acetal polymers, e.g., those of the type disclosed in U.S. Pat. No. 3,027,352, is employed, the melt temperature is in the range of between about 185° C. to 235° C. and preferably 195° C. to 215° C.

In the slit die extrusion method rapid cooling is employed to obtain maximum elasticity. This is accomplished by having the take-up roll relatively close to the extrusion slot, e.g., within 2 inches and, preferably, within 1 inch. The take-up roll or casting drum is preferably cooled by internal cooling means to a temperature in the range of between about 0° C. to 40° C. and "air knife" operating at a temperature between about 0° C. to 40° C. may alternately or in addition, be employed within one inch of the slot to quench, i.e., quickly cool and solidify the film.

Rapid drawdown is an additional means by which maximum elasticity is imparted to the starting elastic films of this invention. Thus, the take-up roll most preferably rotated at a rotational speed sufficient to take-up 10 to 1,000 linear feet per minute of film. More preferably, the take-up roll rotates at a speed to take-up 50 to 500 linear feet per minute.

Independent of the extrusion method employed to form the elastic film employed in the instant invention, the extruded film is preferably heat treated or annealed in order to improve crystal structure. The annealing step increases the size of the crystallites and removed imperfections therein. As a general rule, annealing is carried out at a temperature in the range of between about 5° C. to 100° C. below the melting point of the polymer for a period of a few seconds to several hours, e.g., 5 seconds to 24 hours, and more preferably from about 30 seconds to 2 hours. In the preferred embodiment in which polypropylene is employed, the preferred annealing temperature is in the range of between about 100° C. and 155° C. In the case where oxymethylene (acetal) copolymers are used, the preferred annealing temperature is in the range of between about 110° C. and 165° C.

A preferred method of annealing the elastic film employed in the instant invention is to place the extruded film in a tensioned or tensionless state in an oven at the desired temperature for a residence time in the range of between about 30 seconds to 1 hour.

The elastic film which has been extruded and annealed is ready for processing to form a microporous film in accordance with the instant invention. As mentioned previously, this process generally comprises the steps of cold stretching, followed by sequential hot stretching of the starting non-porous crystalline elastic film. This process is specifically described below.

Turning now to FIG. 1 which illustrates a preferred embodiment of the instant invention, a non-porous, elastic film is unrolled from a supply roll 4 over an idler roll 5 into a cold stretching zone generally denoted at 6. The cold stretching apparatus includes a nip roll 7 which cooperates with a first cluster of three cold stretch rolls 8, driven at a peripheral speed $S_1$ by suitable driving means 9. The elastic film 10 is stretched between the first cold stretch cluster of rolls 8 and a second cluster of three cold stretch rolls 12 which is driven at a peripheral speed $S_2$, where $S_2$ is a greater peripheral speed than $S_1$. Driving means 13 is employed to rotate the second cold stretch cluster 12 at the speed $S_2$. Nip roll 2 cooperates with the second stretch roll 12 as illustrated in FIG. 1.

The cold stretching step which results in a stretching of the elastic film at a cold stretch ratio of $S_2/S_1$, is conducted at a temperature in the range of between about −20° C. to a temperature of approximately 20° C. below the crystalline melting point of the polymer which comprises the film being stretched. For example, in the preferred embodiment wherein polypropylene elastic film is cold stretched, cold stretching occurs at a temperature in the range of between about 25° C. and 120° C.

The cold stretched film, now denoted as 14, is guided into a hot stretching means, generally indicated at 20, by means of one or more idler rolls 15. In a preferred embodiment, the hot stretching means 20 comprises a plurality of rolls disposed in an oven. In one preferred embodiment, illustrated in FIG. 1, the rolls are disposed in festoon configuration. The employment of a festoon arrangement is preferred in that it provides sufficient exposure time in the hot stretch means 20 so as to eliminate the need for any heat setting step after the hot stretching step is concluded. In order to minimize the unsupported film length between adjoining hot stretch rolls, which is relatively long in the preferred festoon arrangement of the instant invention, at least one idler roll is provided between adjoining hot stretch rolls.

It should be appreciated that the above-described hot stretch means 20 is but one preferred embodiment of an operable sequential hot stretched operation. Other arrangements providing for sequential hot stretching are within the contemplation of the instant invention.

In the preferred embodiment illustrated in FIG. 1, the cold stretched film web 14, guided over one or more idler rolls 15, is conveyed onto a first plurality of tensioning rolls 10. A nip roll 3, acting in cooperation with the tensioning rolls 10, preferably three rolls, holds the web 14 in intimate contact with the tensioning rolls 10. The first plurality of tensioning rolls 10 rotate at the same speed, $S_2$, as the cold stretch rolls 12. Thus, in a preferred embodiment driving means 13 are employed to rotate rolls 10. In order to retain the beneficial effects of the cold stretching step, the web 14 is driven downstream onto a second plurality of tensioning rolls 11. The plurality of rolls 11, again in a preferred embodiment three rolls, is driven by driving means 16, imparting a peripheral speed $S_3$ to the rolls 11. A nip 17 is again employed to hold the web 14 in contact with the rolls 11. The peripheral speed $S_3$ is greater than the speed $S_2$. This results in tensioning of the film. Tensioning prevents shrinkage, sag or the like caused by heating. Such effect might well decrease or even eliminate the beneficial effects of the cold stretching step. Although this tensioning step, to prevent film relaxation, results in a small amount of stretching, the primary effect of this procedure is tensioning. Thus this procedure is but a preferred embodiment of a means of maintaining film tension prior to the hot stretching procedure of the instant invention. Other methods that prevent film relaxation as during warm-up of the film prior to hot stretching may alternately be employed.

The tensioned, cold stretched film web 14 is now conveyed downstream onto a first hot stretch roll 21. The film web 14 is hot stretched for the first time between roll 21 and the second tensioning rolls 17. This occurs because of the downstream first hot stretch roll 21 is rotated at a peripheral speed $S_4$ which exceeds the peripheral speed $S_3$ imparted to the web 14 by rolls 11. It should be noted that in idler roll 19 is disposed between rolls 11 and 21 in order to decrease the unsupported film web length during the hot stretching step.

This procedure is continued for as many discrete steps as may be preferred. For example, the film web 14 is stretched for a second time between the first hot stretch roll 21 and a second hot stretch roll 23. In this second hot stretch step, the peripheral speed of the second hot stretch roll 23 is $S_5$. Peripheral speed $S_5$ is greater than the peripheral speed of $S_4$ of the first hot stretch roll 21. Thus, the film web 14 is hot stretched in the second hot stretch step at a hot stretch ratio of $S_5/S_4$. Again, in order to minimize the unsupported film length at least one idler roll 24 is disposed between the second and third hot stretch rolls 23 and 25. In a preferred embodiment, illustrated in FIG. 1, the idler rolls are disposed approximately midway between adjoining hot stretch rolls.

In the preferred embodiment illustrate in FIG. 1 twenty stretching steps, which occur sequentially, are provided. As illustrated in FIG. 1, in order to provide 20 stretching steps, 21 hot stretch rolls are required. (It should be noted that the second tensioning rolls are equivalent to the first hot stretching roll). In general, in the hot stretching apparatus of the instant invention ($n$ + 1) hot stretch rolls are required to provide $n$ sequential hot stretch steps. Preferably two to 40 stretching steps are preferred in the hot stretching operation of the instant invention.

Two preferred methods may be employed to provide continuously increasing peripheral speed with each additional downstream hot stretch roll. In one preferred embodiment, all the rolls are driven by one common drive mechanism. Thus, each hot stretch roll is driven at the same rotational speed. However, each hot stretch roll is of different diameter. More specifically, each additional downstream hot stretch roll has a greater diameter than the upstream roll adjacent to it. Thus, roll 23 is of greater diameter than roll 21 and roll 57, the downstream most roll has a diameter greater than the diameter of the next to last downstream roll 55. As those skilled in the art are aware, the peripheral or surface speed of a larger diameter roll rotating at its center at the same speed as a roll of smaller diameter is greater than the smaller diameter roll. Therefore, the employment of increasingly greater diameter rolls serves the purpose of providing differential peripheral speeds between adjoining hot stretch rolls.

A second preferred method for providing a differential increasing peripheral speeds between adjoining hot stretch rolls is to provide separate driving means for each roll. In this preferred embodiment, each roll may be of the same diameter. The increasing speed of adjoining downstream hot stretch rolls then becomes a function of the power imparted to each roll.

It should be apparent that either of the two preferred embodiments may be employed and each one of these methods are within the scope of the instant invention.

The hot stretching procedure of ths instant invention occurs at a temperature preferably in the range of between about 20° C. below the crystalline melting temperature of the polymer employed as the film to a temperature approximately 5° C. below the crystalline melting point of the polymer. For example, polypropylene film is preferably hot stretched at a temperature of between about 130° C. and about 150° C. It should be appreciated that the "hot stretch temperature" refers to the temperature of film during stretching. This definition applies to the cold stretch temperature also. That is, the cold stretch temperature refers to the film temperature during cold stretching.

In the hot stretching apparatus the film is heated to the temperature range required, in one preferred embodiment by heating means which provides an elevated environment to the hot stretching means 20. In another preferred embodiment, the necessary elevated temperature may be supplied by the hot stretch rolls which are provided with heating means therein. It should be noted, in this regard, that in the cold stretch procedure heating means of the type discussed immediately above may be employed if the cold stretching step occurs at a temperature within the cold stretch range but above ambient temperature.

It should be apparent from the above description that the cold stretch step and the hot stretch step must occur consecutively and in that order only. That is, the cold stretch step must precede the hot stretch step. Furthermore, it should be clear that the stretching occurs in only one direction, the longitudinal or machine direction. It should be furthermore appreciated that the process of the instant invention may be employed in continuous, semi-continuous or batch type operations. The only limitation that must be observed is that the cold stretched film not be allowed to shrink to any significant degree.

The total amount of stretching performed on the elastic film to form the microporous film of the instant invention is preferably in the range of about 10 to 300 percent based on the initial length of the elastic precursor film. More preferably, the total amount of stretching is in the range of between about 50 to 150 percent, again based on the initial length of the elastic film. Of this total stretching, the greatest amount of stretching occurs during the sequential hot stretching procedure.

Thus, the ratio of the amount of hot stretching to the total amount of stretching which occurs in both the cold and hot stretching steps is in the range of from above about 0.10:1 to below about 0.99:1. More preferably, this ratio of percent hot stretch to percent total stretch is in the range of between about 0.50:1 to 0.97:1. Still more preferably, this ratio is in the range of between about 0.60:1 to 0.95:1. For convenience, the ratio of percent hot stretch to percent total stretch is referred to hereinafter as the "extension ratio."

The microporous films formed in accordance with the process of the instant invention, described above, is characterized by a bulk density lower than the density of the corresponding polymeric elastic film having no open-celled structure. Generally, the microporous films formed in accordance with the process of the instant invention have a bulk density no greater than 95 percent of the density of the non-open celled film from which the microporous film is formed. Preferably, the bulk density of the microporous films of the instant invention are in the range of about 50 to 75 percent of the density of the starting elastic film.

The crystallinity of the formed microporous film is preferably at least 30 percent. More preferably, the crystallinity of the microporous film is at least 40 percent, and more preferably 50 to 100 percent crystalline. These figures of percent crystallinity are again determined by the X-ray method referenced above.

The microporous films of the instant invention have an average pore size in the range of between about 100 to 5,000 A. More preferably, the average pore size range is between about 150 to 3,000 A. The values given above for pore size are determined by mercury porosimetry means, as described by R. G. Quynn in Textile Research Journal, pp. 21–34 (January 1963).

The microporous films of the instant invention have an elastic recovery from a 50 percent extension of 60 to 85 percent measured at 25° C. and 65 percent relative humidity. Elastic recovery is determined by a method described in U.S. Pat. No. 3,679,538 which is incorporated herein by reference.

Other physical properties of the microporous film of the instant invention includes a tensile strength of about 20,000 to 30,000 psi, as measured by ASTM test No. D882-Method A (Sample width 15 mm). The modulus of the microporous films of this invention are in the range of between about 100,000 to 300,000 psi. The modulus is also determined by ASTM test No. D882-Method A but the sample width employed in this test is 1 inch. It should be understood that the elastic recovery, the tensile strength and the modulus are all measured in the longitudinal direction.

Another physical property that characterizes the microporous films formed in accordance with this invention is the surface area of the microporous film. Microporous films made in accordance with this invention have a surface area of at least 30 sq. meters per gram. More preferably, the surface area of the microporous films made in accordance with this invention are in the range of between about 40 to 200 square meters per gram. In the preferred embodiment wherein polypropylene is employed as the polymeric film, the microporous film surface area is in the range of between about 30 to 110 square meters per gram. The determination of the surface area of the microporous films of this invention are determined by nitrogen or krypton gas adsorption isotherms using a method and apparatus described in U.S. Pat. No. 3,262,319.

The microporous films formed in accordance with the instant invention are also characterized by their gas flux stability and opacity. These properties will be discussed in greater detail hereinafter.

The following examples are presented to illustrate the instant invention. In view of the fact that these examples are given for illustrative purposes only, they should not, in any way, be construed as limiting the invention thereto.

EXAMPLE I

Crystalline polypropylene having a melt index in the range of between 0.5 and 0.6 and a density of 0.905 gm/cc was melt extruded at a temperature that ranged between 230° C. and 240° C. through a 12 inch diameter blown film die. The film was inflated to provide a blow-up ratio or $D_2/D_1$ ratio, of 1.1. The film was taken up at a draw down ratio of 75:1 resulting in a film .001 inch thick. The polypropylene film was thereafter annealed at a temperature of 145° C. for 23 minutes. The film was thereafter cooled and rewound.

EXAMPLE II

A portion of the film hereinafter referred to as the precursor, formed in accordance with Example I, was cold stretched at a temperature of 25° C. in accordance with the procedure enumerated above and illustrated in FIG. 1. The film was cold stretched to yield a total longitudinal direction elongation of 20 percent based on the length of the precursor film. The film was thereafter hot stretched at a film temperature of 135° C. in accordance with the procedure enumerated in U.S. Pat. No. 3,679,538. The film was hot stretched so that its total elongation was 115 percent of the original precursor, non-porous film length. Alternately expressed, the percent hot stretch to percent cold stretch ratio was 4.75. (20 percent cold stretch; 95 percent hot stretch). The film was thereafter annealed in accordance with prior art procedure (see U.S. Pat. No. 3,679,538).

It should be appreciated that the prior art procedure included the step of preventing relaxation of the film between the cold stretching step and the hot stretching step as does a preferred embodiment of the instant invention. Thus, although the hot stretching procedure of the prior art represents a single stretching step, there was some hot stretching associated with the maintanence of tension on the film as it proceeds from the cold to the hot stretching steps represented no more than 20 percent of the total hot stretching elongation.

A second sample of the precursor film, formed in Example I, is cold stretched exactly as in the above example of the prior art procedure. That is, the precursor film was cold stretched at a temperature of 25° C. to provide a total elongation of 20 percent based on the length of the precursor film. The film was thereafter hot stretched in accordance with the instant invention. Again, the film was hot stretched to a total elongation of 115 percent based on the original precursor film length. Alternately expressed, the ratio of percent hot stretch to percent cold stretch was 4.75 (95 percent hot stretch, 20 percent cold stretch). Similarly, the hot stretching procedure was conducted at a film temperature of 135° C. In general, the conditions under which the stretching step were conducted were equivalent to the conditions occurring in the case of the prior art single hot stretch procedure. However, unlike the prior art process the cold stretched film was hot stretched in 20 discrete, sequential increments. FIG. 1 illustrates the specific embodiment wherein 20 hot stretching increments are employed. The film was guided over adjoining hot stretch rolls which were disposed in a festoon arrangement, again as illustrated in FIG. 1. Idler rolls were provided between the adjoining hot stretch rolls to minimize the unsupported length of the film. 21 hot stretch rolls were employed in order to provide the 20 discrete hot stretch increments which occurred in sequence. This windup speed was maintained in all the examples. The film was thereafter wound up at a wind up speed of 10 ft/min.

EXAMPLE III

Two additional experiments were conducted on further samples of the film formed in Example I. The first experiment was conducted in the same way as the first experiment of Example II except that the cold stretch step represented a 40 percent elongation based on the precursor film length while the hot stretch step represented a 75 percent elongation based again, on the length of the precursor film. Thus, although total elongation was maintained at 115 percent, based on the precursor length as in the prior art, first experiment of Example II, the ratio of percent hot stretch to percent cold stretch was reduced to 1.87. The cold and hot stretching steps were again conducted at film temperatures of 25° C. and 135° C., respectively.

The second experiment of Example III, an example of the instant invention, was conducted under the same conditions as prevailed in the second experiment of Example II. That is, the cold stretching step represented a 40 percent elongation of the precursor film. Sequential hot stretching, which followed the cold stretching operation resulted in a 75 percent elongation. Total elongation was again 115 lpercent and the ratio of percent hot stretch to percent cold stretch was 1.87. The hot stretching step which occurred in 20 discrete steps, was conducted at 135° C.

EXAMPLE IV

Two additional samples were processed from the film formed in Example I. The first sample was processed similarly to the first experiment of Example II, while the second sample was processed in accordance with the procedure enumerated in the second experiment of Example II. Example IV differed from Example II in that the percent elongation contributed by cold stretching step in Example IV represented 31.5 percent of the total 115 percent elongation, based on the length of the precursor film. Thus, the single hot stretching step of the first experiment of this example and the 20 step, sequential hot stretching procedure of the second experiment each contributed 83.5 percent of the total elongation based on the length of the precursor. The extension ratio in this example was 0.73:1. Example IV differed also from Example II in that both samples were hot stretched at a temperature of 140° C.

EXAMPLE V

Two additional precursor film samples formed in Example I were processed in accordance with the procedure enumerated in Example II. The first sample was processed in accordance with the procedure enumerated in the first experiment of Example II, while the second sample was conducted in accordance with the process of the second experiment of Example II. The only difference between Example II and Example V was that the single hot stretching step of the first sample and the 20 step, sequential hot stretching step of the second sample were both processed at a temperature of 145° C. rather than 135° C. as in Example II.

EXAMPLE VI

Two additional precursor samples formed in accordance with the procedure of Example I were processed exactly in accordance with the procedure employed in the formation of Example III except for the difference to be noted hereinafter. The first sample in this example was processed in accordance with the procedure of the first experiment of Example III, a single hot stretching prior art process while the second sample of this example was processed in accordance with the instant invention as enumerated in the second experiment of Example III. The difference between the instant example and the samples processed in Example III was the hot stretch temperature which in this example was 145° C. rather than 135° C. as in Example III.

EXAMPLE VII

Samples of all the microporous films prepared by Examples II–VI were tested to determine their gas flux. The test employed was ASTM D 726-58, Method B. This test which is entitled "Standard Method of Tests for Resistance of Paper to Passage of Air" is reported as Gurley seconds and represents the time it takes for 10 milliliters of air per square inch to pass across a sample of the film being tested. The driving force forcing the air across the film sample is a pressure gradient equal to 12.2 inches of water. The test is applicable to those samples which yield a Gurley result in the range of about 2 to 300 seconds.

Samples of each of the 10 microporous films formed in accordance with Examples II–VI was tested to determine its Gurley value in six separate tests. The average of the six readings was reported.

The test results are reported below in Table 1. It should be emphasized that gas flux is inversely proportional to the Gurley second value of the film. Thus, increasing Gurley represents a film more resistant to the flow of gas through its pores. A value of over 100 Gurley seconds represents a film that is not suitable for employment in many of the applications to which microporous films are usually put.

The results of this test indicate that all but one of the microporous films formed in accordance with the prior art process was not suitable. This is not to say that the prior art process does not result in acceptable microporous films. However, this test employed a marginal type of polypropylene precursor film that did not usually give a very satisfactory result employing the prior art process. However, when the exact same precursor films, employed to produce microporous film in accordance with the prior art process, was processed in accordance with the instant invention in which all variables were kept constant but for the employment of sequential hot stretching rather than single step hot stretching all but one of the samples were well within the acceptable limits for gas flux of microporous films. Even the one sample which was outside the range of acceptability still showed a tremendous improvement over the microporous film formed in accordance with the prior art process.

TABLE I

| | FLUX TEST RESULTS | |
|---|---|---|
| Film Formed By Example | Process | Gas Flux Gurley, Seconds |
| II | Single Hot Stretch | 150 |
| | Sequential Multiple Hot Stretch | 43 |
| III | Single Hot Stretch | 91 |
| | Sequential Multiple Hot Stretch | 60 |
| IV | Single Hot Stretch | 182 |
| | Sequential Multiple Hot Stretch | 64 |
| V | Single Hot Stretch | 2300 |
| | Sequential Multiple Hot Stretch | 390 |
| VI | Single Hot Stretch | 460 |
| | Sequential Multiple Hot Stretch | 98 |

EXAMPLE VIII

Additional samples of the films formed in Examples II – VI were tested to determine their resistance to the flow of gas in accordance with the procedure enumerated in Example VII. The samples were then placed in an oven maintained at a temperature of 90° C. for 1 hour. After removal from the oven the microporous films were again tested to determine their flux stability. Thus, the films were again tested in accordance with ASTM Test D 726-58, Method B and their Gurley second value was again recorded. The flux loss, as measured in percent, was then determined. This determination employed the relationship, Flux Loss (%) = Final Gurley − Initial Gurley/Final Gurley × 100 to calculate flux loss.

The flux loss for Examples II–VI, in which each example is a comparison of the prior art process compared to the process of the instant invention, is reported in Table 2.

EXAMPLE IX

Samples of films formed in Examples II–VI were measured in the longitudinal direction. The samples were then placed in an oven kept at 90° C. for 1 hour. The samples were then taken out of the oven and again measured in the longitudinal direction. The loss in dimensional stability was then determined. The loss figure reported is the decrease in length (initial length minus final length) as a percent of the initial length. The loss in dimensional stability is also reported in Table 2.

TABLE 2

| | STABILITY TEST RESULTS | | |
|---|---|---|---|
| | | Stability (After 1 hr. at 90°C.) | |
| Film formed by Example | Process | Flux Loss % | Machine Direction Shrinkage % |
| II | Prior Art-Single Hot Stretch | 63 | 12 |
| | Multiple Sequential Hot Stretch | 24 | 9 |
| III | Single Hot Stretch | 88 | 22 |
| | Multiple Sequential Hot Stretch | 37 | 11 |
| IV | Single Hot Stretch | 57 | 9 |
| | Multiple Sequential Hot Stretch | 24 | 6 |
| V | Single Hot Stretch | 44 | 5 |
| | Multiple Sequential Hot Stretch | 30 | 4 |
| VI | Single Hot Stretch | 61 | 7 |
| | Multiple Sequential Hot Stretch | 25 | 6 |

It should be appreciated that the use of an elevated temperature environment is used in lieu of long period aging. The use of high temperature over a short period simulates long period aging at ambient temperature. Thus, it is valid to employ short period high temperature aging to determine long term stability of microporous films in normal usage.

Table 2 indicates that the dimensional stability, as well as the flux loss of films formed in accordance with the instant invention are far superior to those formed in accordance with the process of the prior art.

EXAMPLE X

Samples of the films made in accordance with Examples II – VI were tested to determine film opacity, also commonly referred to in the microporous film art as film whiteness. The test for film opacity employed was ASTM Method D 1365-60T. In this test a determination is made of whiteness, described as the "L" value of the sample tested. An opacity of "L" value of 100 indicates pure white. An opacity value of 0 indicates pure black. Thus, the higher the opacity or L value is, the whiter is the film.

Table 3 reports the opacity values for the films made in accordance with the instant invention and in accordance with the prior art process as described in Examples II–VI. The results recorded in Table 3 again indicate the superiority of the process of the instant invention compared to that of the prior art process in terms of resultant opacity of the formed microporous film. The process of the instant invention employing sequential hot stretching results in films having significantly higher opacity values than those of the prior art process.

TABLE 3

OPACITY TEST RESULTS

| Film Formed by Example | Process | Opacity - L Value |
| --- | --- | --- |
| II | Single Hot Stretch | 62.4 |
|  | Sequential Multiple Hot Stretch | 44.9 |
| III | Single Hot Stretch | 58.3 |
|  | Sequential Multiple Hot Stretch | 38.5 |
| IV | Single Hot Stretch | 69.0 |
|  | Sequential Multiple Hot Stretch | 46.6 |
| V | Single Hot Stretch | 73.5 |
|  | Sequential Multiple Hot Stretch | 51.1 |
| VI | Single Hot Stretch | 60.9 |
|  | Sequential Multiple Hot Stretch | 44.5 |

The process of the instant invention, involving multiple sequential hot stretching, compared to the single hot stretching step of the prior art is hypothesized to produce improved permeability, stability and opacity because of the decreased strain rate which occurs during the multiple sequential hot stretching increments compared to the single hot stretching step of the prior art. Decreased strain rate is theorized to produce more uniform, and larger micropores in the film. This would help explain the improved results in such properties as gas flux, stability and opacity. Increased size of micropores increases gas flux. Furthermore, the increased size of micropores explains the increased stability (decreased flux loss). The greater the size of pores the lesser the effect of film shrinkage. Finally, opacity is generally believed to be a function of size and uniformity of pore size. Thus, the decreased strain rate, which results in increase size of pores as well as more uniform pores, results in increased opacity.

EXAMPLE XI

To determine whether multiple sequential hot stretching increments does indeed result in a decreased strain rate during hot stretching, as compared to the single hot stretching procedure of the prior art, the following test was made:

The stretching procedure described in both experiments of Example II was repeated. In this case, however, 60 sets of marks were placed on the unstretched film. Each set of marks were placed 4 ⅛ inch apart. The film was then stretched. When the first set of marks on the stretched film reached the outlet of the oven, the film was stopped. The distance between the marks was then measured. From this experiment the percent stretch as a function of distance travelled in the hot stretching line was then calculated. The resultant curve for the prior art single step hot stretching procedure and for the sequential multiple hot stretching procedure of the instant invention appears in FIG. 2.

Figure 2:
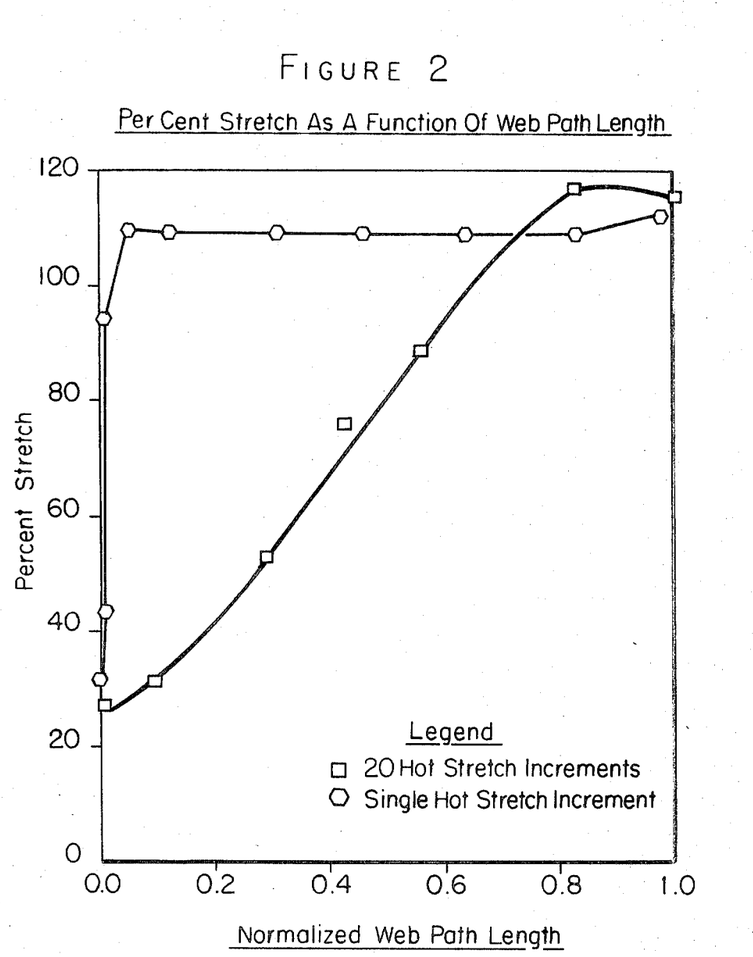
FIG. 2 is a graph of a hot stretch strain profile for a film made in accordance with the instant invention compared to a film made in accordance with the prior art process.

FIG. 2 correlates the percentage increase in length, or percentage stretch, as a function of normalized film path length. To help explain this curve, take a place in the oven a distance 20 percent downstream from the point at which hot stretching begins. In the prior art process (single step hot stretch) at this point the film has reached an increase in length due to stretching of about 110 percent. However, in the process of the instant invention at the equivalent point (about the fourth hot stretch roll) the film has been stretched 40 percent above its original unstretched length. It should be emphasized that at the beginning of hot stretching the percent stretch is not 0 due to prior cold stretching. This further emphasizes the low strain rate of the instant invention.

FIG. 2, in summary, indicates that the average rate of stretching as a function of distance, or the average strain rate, is much lower in the instant invention than in the prior art.

It should be appreciated that although it is believed that the decreased average strain rate is the reason for the improved results accruing from the process of the instant invention, the invention should not be in any way limited by this hypothesis. Thus, in the future if another more acceptable hypothesis or theory for the result obtained from multiple sequential hot stretching compared to single hot stretching if found, this would not in any way effect the validity of the improved process of the instant invention.

The above preferred embodiments and examples are given to illustrate the scope and spirit of the instant invention. Other preferred embodiments and examples within the scope and spirit of the instant invention are within the contemplation of this invention. The invention, therefore, should be limited by only the appended claims.

What is claimed is:

1. A process for the preparation of an open-celled microporous polymer film which comprises:
   uniaxially cold stretching a non-porous, crystalline, elastic film at a temperature in the range of between about −20° C. and a temperature 20° C. below the crystalline melting point of the polymeric film; and
   sequentially hot stretching in the same direction the cold stretched film in a plurality of discrete stretching steps at a temperature in the range of between about 20° C. below the crystalline melting point and 5° C. below the crystalline melting point.

2. A process in accordance with claim 1 wherein the total amount of stretching which occurs in the cold and hot stretching steps is in the range of between about 10 to 300 percent, based on the initial length of the elastic film.

3. A process in accordance with claim 2 wherein the extension ratio is in the range of above about 0.10:1 to below about 0.99:1.

4. A process in accordance with claim 1 wherein the hot stretching step comprises about 2 to 30 discrete, sequential increments.

5. A process in accordance with claim 4 wherein each stretching increment occurs between adjoining hot stretch rolls, disposed in festoon relationship, wherein the downstream roll rotates at a speed greater than the adjoining up stream stretching roll.

6. A process in accordance with claim 1 wherein the film is formed from a polymer selected from the group consisting of polyolefins, polyacetals, polyamides, polyesters, polyalkylene sulfides and polyarylene oxides.

7. In a process for forming an open-celled microporous film comprising the steps of extruding a polymeric melt through a die, to form a film, taking up the film at a draw down ratio in the range of between about 20:1 to 200:1, annealing the film to form an elastic, non-open-celled film, thereafter uniaxially cold stretching the film at a temperature in the range of between about −20° C. and 20° C. below the crystalline melting temperature of the polymeric film, the improvement which comprises: thereafter hot stretching in the same direction the cold stretched film in a plurality of sequential discrete hot stretching increments at a film temperature in the range of between about 20° C. below the crystalline melting point and 5° C. below the crystalline melting point.

8. The improved process of claim 7 wherein the total amount of stretching which occurs in the cold and hot stretching steps is in the range of between about 10 to 300 percent, based on the initial length of the elastic film.

9. The improved process of claim 8 wherein the extension ratio is in the range of above about 0.10:1 to below about 0.99:1.

10. The improved process of claim 7 wherein the hot stretching step comprises about 2 to 30 discrete, sequential increments.

11. The improved process of claim 10 wherein each stretching increment occurs between adjoining hot stretch rolls, disposed in festoon relationship, wherein the downstream roll rotates at a speed greater than the adjoining upstream roll.

12. The improved process of claim 7 wherein the film is formed from a polymer selected from the group consisting of polyolefins, polyacetals, polyamides, polyesters, polyalkylene sulfides and polyarylene oxides.

13. A process for the preparation of an open-celled, microporous polypropylene film comprising the steps of:
    uniaxially cold stretching a non-porous, crystalline, elastic film at a temperature in the range of between about 25° C. and below about 120° C.;
    hot stretching in the same direction the resulting cold stretched film in a plurality of discrete sequential increments at a temperature in the range of between about 120° C. and 150° C. to produce a film stretched, in the longitudinal or machine direction, in the range of between about 10 to 300 percent based on the initial length of the non-porous, elastic polypropylene film, said film formed at an extension ratio in the range of between above 0.10:1 but below about 0.99:1.

* * * * *

UNITED STATES PATENT AND TRADEMARK OFFICE
CERTIFICATE OF CORRECTION

PATENT NO. : 3,843,761
DATED : October 22, 1974
INVENTOR(S) : Bierenbaum et al

It is certified that error appears in the above-identified patent and that said Letters Patent are hereby corrected as shown below:

TABLE 3

OPACITY TEST RESULTS

| Film Formed By Example | Process | Opacity L Value |
|---|---|---|
| II | Single Hot Stretch | 44.9 |
|  | Sequential Multiple Hot Stretch | 62.4 |
| III | Single Hot Stretch | 38.5 |
|  | Sequential Multiple Hot Stretch | 58.3 |
| IV | Single Hot Stretch | 46.6 |
|  | Sequential Multiple Hot Stretch | 69.0 |

UNITED STATES PATENT AND TRADEMARK OFFICE
CERTIFICATE OF CORRECTION

PATENT NO. : 3,843,761
DATED : October 22, 1974
INVENTOR(S) : Bierenbaum et al

It is certified that error appears in the above-identified patent and that said Letters Patent are hereby corrected as shown below:

| | | |
|---|---|---|
| V | Single Hot Stretch | 51.1 |
| | Sequential Multiple Hot Stretch | 73.5 |
| VI | Single Hot Stretch | 44.5 |
| | Sequential Multiple Hot Stretch | 60.9 |

Signed and Sealed this

Twenty-first Day of February 1978

[SEAL]

Attest:

RUTH C. MASON
Attesting Officer

LUTRELLE F. PARKER
Acting Commissioner of Patents and Trademarks